United States Patent
Yamaguchi et al.

(10) Patent No.: US 9,786,914 B2
(45) Date of Patent: Oct. 10, 2017

(54) SPINEL-TYPE LITHIUM COBALT MANGANESE-CONTAINING COMPLEX OXIDE

(71) Applicant: Mitsui Mining & Smelting Co., Ltd., Tokyo (JP)

(72) Inventors: Kyohei Yamaguchi, Takehara (JP); Natsumi Ito, Takehara (JP); Tsukasa Takahashi, Takehara (JP); Tetsuya Mitsumoto, Takehara (JP); Shinya Kagei, Takehara (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/100,354

(22) PCT Filed: Dec. 4, 2014

(86) PCT No.: PCT/JP2014/082104
§ 371 (c)(1),
(2) Date: May 31, 2016

(87) PCT Pub. No.: WO2015/083788
PCT Pub. Date: Jun. 11, 2015

(65) Prior Publication Data
US 2016/0301072 A1    Oct. 13, 2016

(30) Foreign Application Priority Data

Dec. 4, 2013   (JP) .................................. 2013-251403

(51) Int. Cl.
*H01M 4/525*   (2010.01)
*H01M 4/505*   (2010.01)
*C01G 51/00*   (2006.01)
*C01G 53/00*   (2006.01)
*H01M 4/131*   (2010.01)
*H01M 4/52*    (2010.01)
*H01M 10/0525* (2010.01)
*H01M 4/02*    (2006.01)

(52) U.S. Cl.
CPC ............ *H01M 4/525* (2013.01); *C01G 51/54* (2013.01); *C01G 53/54* (2013.01); *H01M 4/131* (2013.01); *H01M 4/505* (2013.01); *H01M 4/523* (2013.01); *H01M 10/0525* (2013.01); *C01P 2002/32* (2013.01); *C01P 2002/60* (2013.01); *C01P 2004/51* (2013.01); *C01P 2004/61* (2013.01); *C01P 2004/64* (2013.01); *C01P 2006/12* (2013.01); *C01P 2006/40* (2013.01); *H01M 2004/028* (2013.01); *H01M 2220/20* (2013.01); *H01M 2220/30* (2013.01)

(58) Field of Classification Search
CPC ...... H01M 4/525; H01M 4/131; H01M 4/505; H01M 4/523; H01M 10/0525; H01M 2004/028; H01M 2220/20; H01M 2220/30; C01G 51/54; C01G 53/54; C01P 2002/32; C01P 2002/60; C01P 2004/51; C01P 2004/61; C01P 2004/64; C01P 2006/12; C01P 2006/40; Y02E 60/122
USPC ....................................................... 252/500
See application file for complete search history.

(56) References Cited

U.S. PATENT DOCUMENTS

| | | | |
|---|---|---|---|
| 7,988,880 B2* | 8/2011 | Kumada | ............ C01G 45/1242 252/182.1 |
| 2007/0202407 A1* | 8/2007 | Eberman | ................ B82Y 30/00 429/231.3 |
| 2010/0243952 A1 | 9/2010 | Kumada et al. | |
| 2012/0082877 A1* | 4/2012 | Song | .................... H01M 4/1315 429/94 |
| 2013/0122372 A1 | 5/2013 | Kagei et al. | |
| 2013/0337330 A1 | 12/2013 | Taniguchi et al. | |

FOREIGN PATENT DOCUMENTS

| | | |
|---|---|---|
| JP | 773962 A | 3/1995 |
| JP | 2000154022 A | 6/2000 |
| JP | 2000235857 A | 8/2000 |
| JP | 2003197194 A | 7/2003 |
| JP | 2004220952 A | 8/2004 |
| JP | 2006134852 A | 5/2006 |
| JP | 201236085 A | 2/2012 |
| JP | 201351104 A | 3/2013 |
| WO | 2009054436 A1 | 4/2009 |
| WO | 2012008480 A1 | 1/2012 |
| WO | 2012118117 A1 | 9/2012 |
| WO | 2013115390 A1 | 8/2013 |

* cited by examiner

*Primary Examiner* — Harold Pyon
*Assistant Examiner* — Danny N Kang
(74) *Attorney, Agent, or Firm* — The Webb Law Firm

(57) ABSTRACT

There is provided a Co-based 5-V spinel-type lithium manganese-containing complex oxide not only having an operating potential of 4.5 V or higher but also being capable of extending its capacity region of a 5.5 to 5.5 V region and being capable of enhancing its energy density as well. There is proposed a spinel-type lithium cobalt manganese-containing complex oxide having a crystal structure classified as a space group Fd-3m and being represented by the general formula $[Li_x(Co_yMn_{3-x-y})O_{4-\delta}]$ (wherein $0.90 \leq x \leq 1.15$ and $0.75 \leq y \leq 1.25$), wherein the oxide has a crystallite size measured by a Rietveld method using the fundamental method of 100 nm to 200 nm, an interatomic distance of Li—O of 1.80 Å to 2.00 Å, and a strain of 0.20 to 0.50.

2 Claims, No Drawings

SPINEL-TYPE LITHIUM COBALT MANGANESE-CONTAINING COMPLEX OXIDE

CROSS REFERENCE TO RELATED APPLICATIONS

This application is the U.S. national phase of International Application No. PCT/JP2014/082104 filed Dec. 4, 2014, and claims priority to Japanese Patent Application No. 2013-251403 filed Dec. 4, 2013, the disclosures of which are hereby incorporated in their entirety by reference.

TECHNICAL FIELD

The present invention relates to a spinel-type lithium cobalt manganese-containing complex oxide capable of being used suitably as a positive electrode active substance of a lithium secondary cell. The present invention relates particularly to a spinel-type lithium cobalt manganese-containing complex oxide capable of having an operating potential of 4.5 V or higher at a metal Li reference potential.

BACKGROUND ART

Lithium secondary cells have characteristics of high energy density, long life and the like. Hence, the lithium secondary cells are used broadly as power supplies for household appliances such as video cameras, portable electronic devices such as laptop computers and cellular phones, and electric tools such as power tools, and recently, have also used as large-size cells mounted on electric vehicles (EVs), hybrid electric vehicles (HEVs) and the like.

Lithium secondary cells are secondary cells having a following structure. In the charge time, lithium dissolves out as ions from a positive electrode and migrates to a negative electrode and is intercalated therein. On the other hand, in the discharge time, lithium ions reversely return from the negative electrode to the positive electrode. Then, their high energy density is known to be due to potentials of their positive electrode materials.

As positive electrode active substances of this kind of lithium secondary cells, there are known, in addition to lithium transition metal oxides having a layer structure such as $LiCoO_2$, $LiNiO_2$ and $LiMnO_2$, spinel-type lithium manganese-containing complex oxides having a manganese-based spinel structure (Fd-3m), such as $LiMn_2O_4$ and $LiNi_{0.5}Mn_{1.5}O_4$.

The spinel-type lithium manganese-containing complex oxides, because of being low in raw material prices and being nontoxic and safe, and furthermore having a property durable to overcharge, are paid attention to as next-generation positive electrode active substances for large-size cells for electric vehicles (EVs), hybrid electric vehicles (HEVs) and the like. Further the spinel-type lithium transition metal oxides (LMOs) capable of three-dimensionally intercalating and deintercalating Li ions, because of being superior in output characteristics to the lithium transition metal oxides having a layer structure such as $LiCoO_2$, are expected to be utilized for applications requiring excellent output characteristics, such as cells for EVs, cells for HEVs and the like.

In recent years, $LiMn_2O_4$ has been known to have an operating potential of nearly 5 V by substituting some of Mn sites therein with other transition metals (Cr, Co, Ni, Fe, Cu), and there are at present actively carried out developments of (5 V-class) manganese-based spinel-type lithium transition metal oxides having an operating potential of 4.5 V or higher.

For example, Japanese Patent Laid-Open No. 11-73962 discloses, as a positive electrode active substance of a lithium secondary cell exhibiting an electromotive force of 5 V-class, a high-capacity spinel-type lithium manganese complex oxide positive electrode active substance made by adding chromium as an essential component to a spinel-type lithium manganese complex oxide, and further adding nickel or cobalt.

Japanese Patent Laid-open No. 2000-235857 discloses a crystal $LiMn_{2-y-z}Ni_yM_zO_4$ (wherein M is at least one selected from the group consisting of Fe, Co, Ti, V, Mg, Zn, Ga, Nb, Mo and Cu; and $0.25 \leq y \leq 0.6$ and $0 \leq z \leq 0.1$) having a spinel structure, which carries out charge and discharge at a potential of 4.5 V or higher vs. Li metal.

Japanese Patent Laid-Open No. 2003-197194 discloses, as a positive electrode material for a high-energy density lithium-ion secondary cell having a high voltage of 4.5 V or higher vs. Li, a spinel-type lithium manganese complex oxide represented by $Li_a(M_xMn_{2-x-y}A_y)O_4$ (wherein $0.4<x$, $0<y$, $x+y<2$ and $0<a<1.2$; M contains one or more metal elements containing at least Ni selected from the group consisting of Ni, Co, Fe, Cr and Cu; and A contains at least one metal element selected from Si and Ti, and in the case where A contains Ti alone, the ratio y of A is $0.1<y$).

Japanese Patent Laid-Open No. 2004-22095 discloses a positive electrode active substance for a nonaqueous electrolyte secondary cell represented by the general formula: $Li_zCo_{1-x-y}Mg_xM_yO_2$ wherein the element M is at least one selected from the group consisting of Al, Ti, Sr, Mn, Ni and Ca; and x, y and z satisfy (i) $0 \leq z \leq 1.03$, (ii) $0.005 \leq x \leq 0.1$ and (iii) $0.001 \leq y \leq 0.03$, wherein the oxide has a crystal structure assigned to a hexagonal system in an overcharge region having a potential of higher than 4.25 V vs. metallic Li; and in a gas chromatography/mass spectroscopy of the oxide in the overcharge region, the maximum value of the oxygen evolution peak is in the range of 330 to 370° C.

A spinel-type lithium cobalt manganese complex oxide (referred to as "Co-based 5 V-class spinel") made by substituting some of Mn sites in $LiMn_2O_4$ with metal elements mainly containing Co to be thereby enabled to have an operating potential of 4.5 V or higher is characterized by having a high potential. It is difficult, however, to simultaneously raise its capacity, and then a problem of the oxide is that it is not easy to enhance the energy density.

Then the present invention relates to a spinel-type lithium cobalt manganese complex oxide made by substituting some of Mn sites in $LiMn_2O_4$ with metal elements mainly containing Co, and is to provide a novel spinel-type lithium manganese-containing complex oxide not only having an operating potential of 4.5 V or higher at a metal Li reference potential but also being capable of extending its capacity region of 5.0 V or higher and being capable of enhancing its energy density as well.

SUMMARY OF THE INVENTION

The present invention proposes a spinel-type lithium cobalt manganese-containing complex oxide having a crystal structure classified as a space group Fd-3m and being represented by the general formula $[Li_x(Co_yMn_{3-x-y})O_{4-\delta}]$ (wherein $0.90 \leq x \leq 1.15$ and $0.75 \leq y \leq 1.25$) or the general formula $[Li_x(Co_yM_zMn_{3-x-y-z})O_{4-\delta}]$ (wherein $0.90 \leq x \leq 1.15$, $0.90 \leq y \leq 1.25$ and $0<z \leq 0.3$; and M is Ni or a combination of Ni with one or two or more elements selected from the group consisting of Mg, Ti, Al, Ba, Cr, Fe, Mo, W, Zr, Y and Nb), wherein the oxide has a crystallite size measured by a Rietveld method using a fundamental method of 100 nm to 200 nm, an interatomic distance of Li—O of 1.80 Å to 2.00 Å, and a strain of 0.20 to 0.50.

Advantageous Effects of Invention

The spinel-type lithium cobalt manganese-containing complex oxide the present invention proposes, due to specification of the crystallite size, the interatomic distance of Li—O and the strain, has an operating potential of 4.5 V or higher, and is also capable of extending its capacity region of 5.0 V or higher and is capable of enhancing its energy density. Therefore, the spinel-type lithium cobalt manganese-containing complex oxide the present invention proposes can be used suitably as a positive electrode active substance of various types of lithium cells.

DETAILED DESCRIPTION OF THE INVENTION

Then, the present invention will be described based on embodiments to carry out the present invention. The present invention, however, is not limited to the embodiments described below.

<Present Positive Electrode Active Substance>

A spinel-type lithium cobalt manganese-containing complex oxide (hereinafter, referred to as "present spinel") according to an example of the present embodiments is a lithium cobalt manganese-containing complex oxide having a crystal structure classified as a space group Fd-3m, wherein the oxide has a crystallite size of 100 nm to 200 nm, an interatomic distance of Li—O measured by the Rietveld method using the fundamental method of 1.80 Å to 2.00 Å, and a strain of 0.20 to 0.50.

The present inventors presumed that Co-based 5 V-class spinels conventionally known, since their particles or crystals were too small, were liable to react with an electrolyte solution in the charge time and destroy their structure, to resultantly sometimes reduce their voltage sharply in the discharge time. Then, it has been confirmed that the present spinel, due to specification of the crystallite size, the interatomic distance of Li—O and the strain in predetermined ranges, can prevent a sharp voltage reduction in the discharge time. Based on such a finding, the present inventors have conceived the present invention.

(Present Spinel)

The present spinel can be a lithium cobalt manganese-containing complex oxide represented by the general formula (1): $[Li_x(Co_yMn_{3-x-y})O_{4-\delta}]$.

In the above formula (1), "x" can be 0.90 to 1.15, and is particularly 0.95 or more and 1.14 or less, and more preferably 1.00 or more and 1.13 or less.

In the above formula (1), "y" can be 0.75 to 1.25, and is particularly 0.76 or more and 1.15 or less, and more preferably 0.77 or more and 1.05 or less.

The present spinel may also be a lithium cobalt manganese-containing complex oxide represented by the general formula (2): $[Li_x(Co_yM_zMn_{3-x-y-z})O_{4-\delta}]$.

Since Co is a comparatively expensive metal, the present inventors have studied the lithium cobalt manganese-containing complex oxide represented by the above general formula (1) to see whether or not the amount of Co can be reduced with its effect being maintained. As a result, it has been found that the lithium cobalt manganese-containing complex oxide represented by the above general formula (2) can reduce the amount of Co while there is maintained the same effect as that of the lithium cobalt manganese-containing complex oxide represented by the above general formula (1).

In the above formula (2), "x" can be 0.90 to 1.15, and is particularly 0.95 or more and 1.14 or less, and more preferably 1.00 or more and 1.13 or less.

In the above formula (2), "y" can be 0.90 to 1.25, and is particularly 0.91 or more and 1.24 or less, and more preferably 0.92 or more and 1.23 or less.

In the above formula (2), "z" can be more than 0 and 0.3 or less, and is particularly more than 0 and 0.29 or less, more preferably more than 0 and 0.28 or less, and still more preferably more than 0 and 0.27 or less.

Further "M" in the above formula (2) can be Ni or a combination of Ni with one or two or more elements selected from the group consisting of Mg, Ti, Al, Ba, Cr, Fe, Mo, W, Zr, Y and Nb.

Here, since spinel-structure oxides generally contain oxygen deficiency, "4−δ" in the general formulae (1) and (2) indicates that part of oxygen may be substituted with other elements such as fluorine.

However, the present spinel may contain other components. The other elements may be contained particularly as long as being each 0.5% by mass or less. This is conceivably because the amounts in such degrees scarcely affect the performance of the present spinel.

(Interatomic Distance of Li—O)

In the present spinel, it is important that the interatomic distance of Li—O measured by the Rietveld method using the fundamental method is 1.80 Å to 2.00 Å; and the interatomic distance is preferably 1.800 Å to 2.000 Å, especially preferably 1.830 Å or longer and 1.950 Å or shorter, and more especially preferably 1.850 Å or longer and 1.900 Å or shorter.

Here, the regulation of the interatomic distance of Li—O of the present spinel in the above range may be carried out by regulation of, for example, the raw material mixing ratios and the calcining conditions. However, regulation methods are not limited to these methods.

(Strain)

In the present spinel, it is important the strain measured by the Rietveld method using the fundamental method is lower than 0.50. The strain is preferably lower than 0.500, especially preferably 0.100 or higher and 0.495 or lower, and more especially preferably 0.200 or higher and 0.490 or lower, further 0.400 or lower.

Here, the regulation of the strain of the present spinel in the above range may be carried out by regulation of, for example, the calcining conditions, the heat treatment (annealing) conditions and the crushing conditions. However, regulation methods are not limited to these methods.

(Crystallite Size)

In the present spinel, the crystallite size is preferably 100 nm to 200 nm, especially preferably 105 nm or larger and 190 nm or smaller, and more especially preferably 110 nm or larger and 180 nm or smaller, further 120 nm or larger.

Here, the regulation of the crystallite size of the present spinel in the above range may be carried out by regulation of, for example, the calcining conditions, the heat treatment (annealing) conditions and the crushing conditions. However, regulation methods are not limited to these methods.

Here, the "crystallite" means a largest aggregation which can be regarded as a single crystal, and can be determined by an XRD measurement and the Rietveld analysis.

In the present spinel, when the interatomic distance of Li—O is 1.80 Å to 2.00 Å, since the crystal structure becomes stable, during the discharge, that is, even if Li is deintercalated in an electrode and 8a sites become vacant, the crystal structure becomes stable.

Further in the present spinel, when the strain is lower than 0.50, the strain is low enough and the crystal structure becomes stable. Hence, this leads to having a sufficient crystal structure capable of withstanding the expansion and contraction of the crystal structure by intercalation and deintercalation of Li accompanying the charge and discharge.

Further in the present spinel, when the crystallite size is 100 nm to 200 nm, the size of the crystal is moderately large and the crystal structure is stable. Hence, this leads to stabilizing the crystal structure to the expansion and contraction of the crystal structure accompanying intercalation and deintercalation of Li in the charge and discharge time.

Therefore, in the present spinel, by regulating the Li—O distance, the strain and the crystallite size in the above ranges, the crystal structure becomes stable; the present spinel has an operating potential of 4.5 V or higher, and is also capable of extending its capacity region of 5.0 V or higher, and is also capable of enhancing its energy density.

Then, by measuring the distance between Li—O and the crystallite size of the spinel-type lithium cobalt manganese-containing complex oxide after being used as a positive electrode active substance of a cell, that is, after charge and discharge, the distance between Li—O and the crystallite size of the spinel-type lithium cobalt manganese-containing complex oxide in the initial state can be determined.

The measurement of the distance between Li—O and the crystallite size of the spinel-type lithium cobalt manganese-containing complex oxide after charge and discharge can be carried out by disassembling the cell, taking out the spinel-type lithium cobalt manganese-containing complex oxide, thereafter fabricating the spinel-type lithium cobalt manganese-containing complex oxide in a state of being discharged down to 3.0 V vs. a counter electrode lithium, enclosing the resultant in a polyethylene bag in an argon atmosphere, and measuring the distance between Li—O and the crystallite size in the diffraction angle 2θ measuring range of XRD of 30 to 120°. The reason that at this time, the measurement is carried out at 30° or larger is to avoid such an influence that when the measurement angle is lower than 30°, there exist diffraction peaks of a conductive material and a binder in some regions and the peaks affect the diffraction intensity of the spinel-type lithium cobalt manganese-containing complex oxide.

(D50)

In the present spinel, D50 according to the particle size distribution in terms of volume acquired by a measurement by a laser diffraction scattering-type particle size distribution measuring method is preferably 5 μm to 20 μm, particularly 7 μm or larger and 17 μm or smaller, and more particularly 10 μm or larger and 15 μm or smaller, especially preferably 14 μm or smaller.

The regulation of D50 of the present spinel in the above range in such a manner may be carried out by regulation of the calcining conditions (temperature, time, atmosphere and the like), the crushing power (rotation frequency of a crushing machine, and the like) after the calcination, and the like. However, regulation methods are not limited to these methods.

(Specific Surface Area)

The specific surface area of the present spinel is, from the viewpoint of the reactivity with an electrolyte solution, preferably 1.0 m$^2$/g to 5.0 m$^2$/g, particularly 3.5 m$^2$/g or smaller, and more preferably 3.2 m$^2$/g or smaller.

It is generally a technical common sense that a larger specific surface area brings about a larger amount of gas evolution. The present spinel is, however, although having a specific surface area nearly equal to that of conventional manganese-based spinel-type lithium transition metal oxides, characterized in the point that the amount of gas evolution can be suppressed remarkably.

The regulation of the specific surface area of the present spinel in the above range may be carried out by regulation of the calcining conditions (temperature, time, atmosphere and the like), the crushing power (rotation frequency of a crushing machine, and the like) after the calcination, and the like. However, regulation methods are not limited to these methods.

<Production Method of the Present Spinel>

Then, one example of a production method of the present spinel will be described.

The present spinel can be obtained, for example, by mixing a lithium raw material, a manganese raw material, a cobalt raw material, and further as required, raw materials of the elements M in the above general formula (2), as required, granulating and drying the mixture, calcining the resultant, as required, classifying the resultant, further as required, subjecting the resultant to a heat treatment (annealing), and further as required, classifying the resultant.

Here, the lithium raw material is not especially limited. Examples of the lithium raw material include lithium hydroxide (LiOH), lithium carbonate (Li$_2$CO$_3$), lithium nitrate (LiNO$_3$), lithium hydroxide monohydrate (LiOH.H$_2$O), lithium oxide (Li$_2$O), and besides, fatty acid lithium and lithium halides. Among these, hydroxide salts, carbonate salts and nitrate salts of lithium are preferable.

The manganese raw material is not especially limited. There can be used, for example, manganese carbonate, manganese nitrate, manganese chloride and manganese dioxide. Among these, manganese carbonate and manganese dioxide are preferable. Among these, electrolytic manganese dioxide obtained by an electrolysis method is especially preferable.

The cobalt raw material is not especially limited. There can be used, for example, basic cobalt carbonate, cobalt nitrate, cobalt chloride, cobalt oxyhydroxide, cobalt hydroxide, cobalt oxide and hydrous cobalt oxide, and among these, preferable are basic cobalt carbonate, cobalt hydroxide, cobalt oxide, cobalt oxyhydroxide and hydrous cobalt oxide.

As the raw materials for the elements M, there can be used carbonate salts, nitrate salts, chlorides, oxyhydroxide salts, hydroxides and the like of the elements M.

The present spinel may be obtained also by adding a boron compound to the above raw materials and mixing the mixture, and wet crushing the resultant, thereafter granulating and drying the resultant, and calcining the resultant.

When the boron compound is added and calcined, since there can be promoted the sintering of microparticles made by aggregation of crystal particles of the spinel-type lithium cobalt manganese-containing complex oxide, thus being able to form compact aggregated microparticles (secondary particles), the packing density (tap density) can be enhanced. Simultaneously since there can be promoted the formation and growth of crystals of the spinel-type lithium cobalt manganese-containing complex oxide, the crystallite size of the spinel-type lithium cobalt manganese-containing complex oxide can be made large and the number of interfaces in the primary particle is reduced, thus being able to raise the discharge capacity in a high-load discharge.

As the boron compound, preferably used is boric acid or lithium borate. As lithium borate, there can be used various forms thereof, for example, lithium metaborate ($LiBO_2$), lithium tetraborate ($Li_2B_4O_7$), lithium pentaborate ($LiB_5O_8$) and lithium perborate ($Li_2B_2O_5$). Among these, lithium tetraborate ($Li_2B_4O_7$) is preferable. The element B does not dissolve as a solid solution in the spinel, and has a function of promoting sintering of the spinel in the calcination process.

The amount in terms of boron (B) element of the boron compound to be added is regulated in the range of larger than 0% by mass and 0.3% by mass or smaller of the spinel-type lithium cobalt manganese-containing complex oxide, especially in the range of 0.0001 to 0.2% by mass, particularly in the range of 0.01 to 0.18% by mass, and preferably in the range of 0.05 to 0.16% by mass.

The method of mixing the raw materials is not especially limited as long as being capable of homogeneous mixing. The mixing may be carried out, for example, by using a well-known mixing machine such as a mixer, adding the raw materials simultaneously or in a proper order and stirring and mixing the mixture in a wet or dry state. In the case of the wet mixing, it is preferable that liquid media such as water and a dispersant are added to the raw materials, which are then wet mixed to thereby make a slurry, and the obtained slurry is crushed by a wet crusher. The obtained slurry is especially preferably crushed to submicron order. By granulating and calcining the obtained slurry after having been crushed to submicron order, the uniformity of the particles before the calcination reaction can be raised and the reactivity can be raised.

The raw materials mixed in the above manner may be calcined as they are, but may be granulated in a predetermined size and then calcined.

A granulation method may be of a wet type or a dry type as long as the raw materials crushed in the previous step are not separated and are dispersed in granulated particles, and may be an extruding granulation method, a tumbling granulation method, a fluidized granulation method, a mixing granulation method, a spray drying granulation method, a pressing granulation method, or a flake granulation method using a roll or the like. In the case of the wet granulation, however, sufficient drying before the calcination is needed. The drying may be carried out by a well-known drying method such as a spray heat drying method, a hot air drying method, a vacuum drying method, or a freeze drying method, and among these, a spray heat drying method is preferable. The spray heat drying method is carried out preferably by using a heat spray dryer (spray dryer). By the granulation using a heat spray dryer (spray dryer), not only the particle size distribution can be made sharper, but also granules can be prepared so as to contain roundly aggregated particles (secondary particles).

The calcination is carried out in a calcining furnace preferably in an air atmosphere, an oxygen gas atmosphere, an atmosphere whose oxygen partial pressure is regulated, a carbon dioxide gas atmosphere, or another atmosphere, by raising its temperature at a temperature-rise rate of 50 to 200° C./hr and holding its temperature at a calcining temperature of 700 to 950° C. (the temperature is that in the case where a material to be calcined in the calcining furnace is brought into contact with a thermocouple) for 0.5 hours to 300 hours. In the case where the calcination is carried out together with the boron compound, however, the calcination can be carried out at a temperature in a lower temperature region than the above-mentioned calcining temperature. This is because the addition of the boron compound can promote the sintering.

At this time, the regulation of the crystallite size into 100 nm to 200 nm is preferably carried out by regulation of the calcining temperature in a temperature range of higher than 800° C. If the calcining temperature is made higher than 950° C., however, since the crystallite size becomes large drastically and the preferable cell performance cannot be provided resultantly, the calcining temperature is regulated preferably at 800 to 950° C., especially preferably in the temperature range of higher than 800° C. and lower than 950° C. The reason is conceivably because when the crystallite size becomes too large, the Li diffusion distance in the crystal becomes long.

The kind of the calcining furnace is not especially limited. The calcination can be carried out, for example, by using a rotary kiln, a stationary furnace or another calcining furnace.

Since the interatomic distance of Li—O can be varied by regulating the shape of a calcining vessel, the proportion of the amount of packing of raw materials to be calcined to the opening area (open area) of the calcining vessel, and the like, these conditions are preferably regulated so as to fall in the predetermined ranges.

Further the calcining temperature-rise rate also affects the interatomic distance of Li—O in some cases. Since the sharp temperature rise causes carbon dioxide gas due to the thermal decomposition of lithium carbonate to escape from specific sites and the reaction to be made heterogeneous, and a desired interatomic distance of Li—O cannot be obtained resultantly, it is preferable to find out a best calcining temperature-rise rate.

After the calcination, as required, the heat treatment (annealing) is preferably carried out.

The heat treatment (annealing) conditions are preferably such that the object is placed, for example, in an air atmosphere in an environment of 500° C. to 800° C., preferably 650° C. or higher and 800° C. or lower, for 0.5 to 300 hours to thereby make oxygen to be easily introduced.

The classification after the calcination has a technical significance of regulation of the particle size distribution of an aggregated powder and also removal of foreign matter, and is preferably carried out in the range of the average particle diameter (D50) of 1 μm to 75 μm.

<Applications of the Present Spinel>

The present spinel, unlike conventional spinel-type lithium manganese-containing complex oxides, has an operating potential of 4.5 V or higher at a metal Li reference potential, and is capable of extending its capacity region of 5.0 V or higher and is capable of enhancing its energy density.

Hence, the present spinel is, as required, cracked and classified, and thereafter as required, mixed with other positive electrode active substance materials, for example, a lithium manganese oxide assuming a layer structure and a spinel-type lithium manganate different from the present spinel, and can effectively be utilized as a positive electrode active substance of various types of lithium cells.

Specifically, in the case where the present spinel is utilized as a positive electrode active substance of various types of lithium cells, a positive electrode mixture can be produced, for example, by mixing the present spinel, a conductive material composed of carbon black and the like, and a binder composed of a Teflon (R) binder and the like. Then, by using such a positive electrode mixture for a positive electrode, using lithium or a material capable of intercalating and deintercalating lithium, such as carbon, for a negative electrode, and using, for a nonaqueous electrolyte, a solution in which a lithium salt such as lithium hexafluorophosphate ($LiPF_6$) is dissolved in a mixed solvent of ethylene carbonate-dimethyl carbonate or the like, a lithium cell can be constituted.

The lithium cell thus constituted can be used as a driving power supply, for example, for laptop computers, cellular phones, cordless phone slave units, video movies, liquid crystal display televisions, electric shavers, portable radios, headphone stereos, backup power supplies, electronic devices such as memory cards, and medical devices such as pace makers and hearing aids, and for being mounted on electric vehicles. The lithium cell is especially effective as a driving power supply, particularly for cellular phones, various types of portable computers such as PDAs (portable digital assistants) and laptop computers, electric vehicles (including hybrid vehicles), power storage supplies, and the like, which all require excellent cyclability.

<Explanation of Terms>

In the present description, in the case of being expressed as "X to Y" (X and Y are arbitrary numbers), unless otherwise specified, the expression includes a meaning of "X or more and Y or less," and also a meaning of "preferably more than X" and "preferably less than Y."

Further in the case of being expressed as "X or more" (X is an arbitrary number) or "Y or less" (Y is an arbitrary number), the expression includes an intention to the effect of "preferably more than X" or "preferably less than Y."

EXAMPLES

Then, based on Examples and Comparative Examples, the present invention will be described further. The present invention, however, is not limited to the following Examples.

Example 1

Lithium carbonate, electrolytic manganese dioxide (containing 0.03% by mass of Mg, TG weight loss when heated at 200° C. to 400° C.: 3.0%) and cobalt oxyhydroxide (CoO(OH)) were weighed so as to make a target composition indicated in Table 1; and water was added thereto, and mixed and stirred to thereby prepare a slurry having a solid content concentration of 50% by weight.

A polycarboxylic acid ammonium salt (manufactured by San Nopco Ltd., SN Dispersant 5468) of 5% by weight of the slurry solid content was added as a dispersant to the obtained slurry (500 g as a raw material powder), and crushed by a wet crusher at 1,300 rpm for 20 min to thereby obtain a crushed slurry.

The obtained crushed slurry was granulated and dried by using a heat spray dryer (manufactured by Ohkawara Kakohki Co., Ltd., Spray Dryer "i-8") to obtain a granulated powder. At this time, the spraying used a rotary disk, and the granulation and drying was carried out at a rotation frequency of 30,000 rpm, at an amount of slurry to be fed of 24 kg/hr and by regulating the temperature so that the temperature of the outlet port of the drying tower became 100° C.

The obtained granulated powder was packed in a sagger of a 20 cm×20 cm×11.5 cm size, heated, by using a stationary electric furnace, at a temperature-rise rate of 1.33° C./min up to 850° C. (product temperature) in an air atmosphere, held for 24 hours, and thereafter cooled at a temperature-fall rate of 1.33° C./min down to room temperature. Thereafter, the powder, by using the same stationary electric furnace as that for the calcination, was heated at a temperature-rise rate of 1.33° C./min up to 700° C. (product temperature) in an air atmosphere, held for 12 hours, and cooled at a temperature-fall rate of 1.33° C./min down to room temperature. Then, the resultant was crushed by an Orient Mill, and classified with a sieve having a sieve opening of 53 μm; and the undersize product was recovered to thereby obtain a spinel-type lithium cobalt manganese-containing complex oxide (sample).

There are shown in Table 2 and Table 3 the following properties of the obtained sample: the Li—O and Me-O interatomic distances ("Li—O," "Me-O"), the crystallite size, the strain, the index (Rwp) to indicate the degree of coincidence of the observed intensity with the calculated intensity, the index (GOF) to indicate the adequacy of fitting, D10, D50, Dmin, and the specific surface area (SSA). There are also shown in Table 4 the results of the charge capacity, the discharge capacity, the charge and discharge efficiency, the open circuit voltage after charge, the proportion of the discharge 5.5-5.0 V region, and the proportion of the discharge 5.5-4.7 V region (the same for the other Examples and the Comparative Examples).

Here, "Me" of Me-O is metal elements present on 16d sites, and in the present spinel, is constituted of Co, Mn and the elements M, and excessive Li.

Example 2

A spinel-type lithium cobalt manganese-containing complex oxide (sample) was obtained as in Example 1, except for altering the target composition, the calcining temperature, the calcining time and the heat treatment (annealing) time to those indicated in Table 1.

Example 3

A spinel-type lithium cobalt manganese-containing complex oxide (sample) was obtained as in Example 1, except for altering the target composition to that indicated in Table 1.

Example 4

A spinel-type lithium cobalt manganese-containing complex oxide (sample) was obtained as in Example 1, except for mixing, as a raw material, nickel hydroxide in addition to the raw materials used in Example 1, and altering the target composition, the calcining conditions and the heat treatment (annealing) conditions to those indicated in Table 1.

Comparative Example 1

A spinel-type lithium cobalt manganese-containing complex oxide (sample) was obtained as in Example 1, except for altering the calcining temperature and time and the target composition to those indicated in Table 1, and carrying out no heat treatment (annealing).

Comparative Example 2

A spinel-type lithium cobalt manganese-containing complex oxide (sample) was obtained as in Example 1, except for altering the calcining temperature and time and the target composition to those indicated in Table 1, and carrying out no heat treatment (annealing).

Comparative Example 3

Lithium carbonate, electrolytic manganese dioxide (containing 0.03% by mass of Mg, TG weight loss when heated at 200° C. to 400° C.: 3.0%) and nickel hydroxide were weighed so as to make a target composition indicated in Table 1; and water was added thereto, and mixed and stirred to thereby prepare a slurry having a solid content concentration of 10% by weight.

A polycarboxylic acid ammonium salt (manufactured by San Nopco Ltd., SN Dispersant 5468) of 5% by weight of the slurry solid content as a dispersant was added to the obtained slurry (500 g as a raw material powder), and crushed by a wet crusher at 1,300 rpm for 20 min to thereby obtain a crushed slurry.

The obtained crushed slurry was granulated and dried by using a heat spray dryer (manufactured by Ohkawara Kakohki Co., Ltd., Spray Dryer "OC-16") to obtain a granulated powder. At this time, the spraying used a rotary disk, and the granulation and drying was carried out at a rotation frequency of 24,000 rpm, at an amount of slurry to be fed of 24 kg/hr and by regulating the temperature so that the temperature of the outlet port of the drying tower became 100° C.

The obtained granulated powder was calcined, by using a stationary electric furnace, in an air atmosphere so as to be held at 950° C. (product temperature) for 35 hours, and thereafter subjected to a heat treatment (annealing), in the same stationary electric furnace as that for the calcination, in an air atmosphere so as to be held at 700° C. (product temperature) for 35 hours. Then, the resultant was crushed by an Orient Mill, and classified with a sieve having a sieve opening of 53 μm; and the undersize product was recovered to thereby obtain a spinel-type lithium manganese-containing complex oxide (sample).

Comparative Example 4

A spinel-type lithium cobalt manganese-containing complex oxide (sample) was obtained as in Example 4, except for altering the target composition to that indicated in Table 1.

<Measurement Methods of Various Physical Property Values>

Various physical property values of the spinel-type lithium cobalt manganese-containing complex oxide powders (samples) obtained in the Examples and the Comparative Examples were measured as follows.

<Chemical Analysis Measurement>

The amount of each element of the spinel-type lithium cobalt manganese-containing complex oxide powders (samples) obtained in the Examples and the Comparative Examples was measured by an inductively coupled plasma (ICP) atomic emission spectrometry, and analyzed values are described in Table 2.

<Structural Analyses: Measurements of the Interatomic Distances of Li—O and Me-O, the Crystallite Size, the Strain and the Like>

The interatomic distances of Li—O and Me-O and the crystallite size of the spinel-type lithium cobalt manganese-containing complex oxide powders (samples) obtained in the Examples and the Comparative Examples were measured by the Rietveld method using the fundamental method, which will be described in the following.

The Rietveld method using the fundamental method is a method of refining the structural parameters of a crystal from diffraction intensities acquired by powder X-ray diffractometry or the like. The method is means of refining various parameters of the crystal structure so that with an assumption of a crystal structure model, an X-ray diffraction pattern derived by calculations from its structure and an X-ray diffraction pattern actually measured are made coincident as nearly as possible.

The measurement of the X-ray diffraction pattern used an X-ray diffractometer (D8 ADVANCE, manufactured by Bruker AXS K.K.) using a Cu-Kα line. The analysis was carried out on the X-ray diffraction pattern acquired in the range of diffraction angles 2θ of 10 to 120° and by using analysis software (product name "Topas Version 3"), and the interatomic distances of Li—O and Me-O, the crystallite size and the strain were thereby determined.

Here, the calculation was repeatedly carried out until as indicated in Table, the indices Rwp and GOF representing the degree of coincidence of an observed intensity with a calculated intensity converged on goals of Rwp<8.0 and GOF<2.0, with the assumption that the crystal structure is attributed to a cubic system of a space group Fd-3m (Origin Choice 2) in which Li is present on its 8a site; Mn and Co, and in some Examples, the elements M and x of an excessive Li content, are present on its 16d site; and O occupies its 32e site, and with the oxygen seat occupancy and the atomic displacement parameter Beq. being fixed as 1 and the oxygen fraction coordinate being taken as a variable.

The crystallite size and the strain were analyzed by using Gauss function.

Additionally, the instrument specification, the instrument conditions and the like used in the measurement and the Rietveld method analysis are as follows.

Detector: PSD
Detector Type: VANTEC-1
High Voltage: 5,585 V
Discr. Lower Level: 0.35 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving Slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.004933548 Th In the X-ray diffraction pattern of Comparative Example 4, the intensity ratio of the (111) plane and the (311) plane was inverted to the other samples and it was then conceivably highly possible that the main phase was not Fd-3m. Therefore, Rietveld method analysis was not carried out thereon.

(Specific Surface Area)

The specific surface area (SSA) of the spinel-type lithium cobalt manganese-containing complex oxide powders (samples) obtained in the Examples and the Comparative Examples was measured as follows.

First, 0.5 g of the sample (powder) was weighed in a glass cell for a flow-type gas adsorption-measuring specific surface area analyzer MONOSORB LOOP ("product name: MS-18," manufactured by Yuasa Ionics), and was subjected to a heat treatment (annealing), after the glass cell interior was replaced by nitrogen gas at a gas volume of 30 mL/min for 5 min by using a pre-treatment apparatus for the MONOSORB LOOP, in the nitrogen gas atmosphere at 250° C. for 10 min. Thereafter, the sample (powder) was measured by one point method for BET by using the MONOSORB LOOP.

Here, as an adsorption gas in the measurement, a mixed gas of 30% of nitrogen and 70% of helium was used.
(D10, D50, Dmin)

The particle size distribution of the spinel-type lithium cobalt manganese-containing complex oxide powders (samples) obtained in the Examples and the Comparative Examples was measured by charging the sample (powder) in a water-soluble solvent by using an automated sample feed machine ("Microtrac SDC," manufactured by Nikkiso Co., Ltd.) for a laser diffraction particle size distribution analyzer, irradiating the mixture with a 40-W ultrasonic wave for 360 sec in a flow rate of 40%, thereafter measuring the particle size distribution by using the laser diffraction particle size distribution analyzer "MT3000II," manufactured by Nikkiso Co., Ltd., and measuring D10, D50 and Dmin from a chart of an obtained particle size distribution in terms of volume.

Here, the water-soluble solvent in the measurement was passed through a 60-µm filter; and with the following conditions: the solvent refractive index was 1.33; the particle transparency condition was transmission; the particle refractive index was 2.46; the shape was taken as nonspherical; the measurement range was 0.133 to 704.0 µm; and the measuring time was 30 sec, an average value of two-times measurements was used as D10, D50 and Dmin.

<Cell Evaluation>
(Cell Fabrication)

The evaluation of Li cells was carried out by the following method.

89% by weight of the "spinel-type lithium cobalt manganese-containing complex oxide powders (samples)" fabricated in the Examples and the Comparative Examples, 5% by weight of an acetylene black as a conduction supporting agent and 6% by weight of a PVDF as a binder were mixed, and made into a paste by adding NMP (N-methylpyrrolidone). The paste was applied on an Al foil current collector of 15 µm in thickness, and dried at 120° C. Thereafter, the resultant was pressed into 80 µm in thickness to thereby fabricate a positive electrode sheet. The positive electrode sheet obtained in the above was cut out into a size of φ13 mm to thereby make a positive electrode; on the other hand, lithium metal was cut out into a size of φ15 mm to thereby make a negative electrode; and a separator (porous polyethylene film) impregnated with an electrolyte solution in which $LiPF_6$ was dissolved in 1 mol/L in a carbonate-based mixed solvent was placed between the positive electrode and the negative electrode to thereby fabricate a 2032-type coin cell.

(Measurement of the Charge Capacity)

The coin cell fabricated in the above was first charged and discharged (activated) at a temperature of 20° C. in two cycles between 5.4 V and 3.0 V, and thereafter charged at 0.2 mA up to 5.4 V; and the charge capacity at the third cycle was thus measured. Here, the charge capacity was represented as a capacity (mAh/g) per positive electrode active substance mass in the positive electrode.

(Measurement of the Discharge Capacity)

After the charge at the third cycle carried out in (Measurement of the charge capacity), discharging was carried out at a discharge current of 0.2 mA down to 3.0 V, and the discharge capacity was thus measured.

Here, the discharge capacity was represented as a capacity (mAh/g) per positive electrode active substance mass in the positive electrode.

(Calculation of the Charge and Discharge Efficiency)

The charge and discharge efficiency (%) was calculated from the charge capacity and the discharge capacity by the following expression.

(discharge capacity/charge capacity)×100

(Measurement of the Open Circuit Voltage after Charge)

The coin cell fabricated in the above was first activated at a temperature of 20° C. in two cycles, and thereafter charged as the third cycle at a charge capacity of 0.2 mA up to 5.4 V, and after the cell reached 5.4 V, was open-circuited and held for 10 min. The voltage value 10 min later is a value of an open circuit voltage after charge, shown in Table 4.

(Calculation Method of the 5.5-5.0 V Region Discharge Capacity (mAh/g) and the 5.5-4.7 V Region Discharge Capacity (mAh/g))

The discharge capacity from the open circuit voltage down to 3.0 V was measured. The discharge capacity was represented as a capacity (mAh/g) per positive electrode active substance mass in the positive electrode. Here, the open circuit voltage is present between 5.5 to 5.0 V.

Then, as shown in Table 4, there were determined the discharge capacity in a region from the open circuit voltage to 4.7 V (referred to as "5.5-4.7 V") and the discharge capacity in a region from the open circuit voltage to 5.0 V (referred to as "5.5-5.0 V"); and the proportion (%) of the 5.5-4.7 V region and the proportion (%) of the 5.5-5.0 V region were each calculated by dividing the discharge capacities in the respective regions by the discharge capacity in a region from the open circuit voltage to 3.0 V measured as described above (referred to as "5.5-3.0 V") (×100).

Here, the proportion (%) of the 5.5-4.7 V region and the proportion (%) of the 5.5-5.0 V region have a meaning of discharge capacity proportions in the two high-voltage regions out of the total discharge capacity from the open circuit voltage to 3 V, and can be made indices to indicate a high-voltage energy supply capability.

TABLE 1

| | | Calcining Conditions | | | |
| | | Regular Calcination | | Annealing | |
| | Target Composition | Temperature (° C.) | Time (h) | Temperature (° C.) | Time (h) |
| --- | --- | --- | --- | --- | --- |
| Example 1 | $Li_{1.00}Co_{0.90}Mn_{1.10}O_4$ | 850 | 24 | 700 | 12 |
| Example 2 | $Li_{1.00}Co_{1.00}Mn_{1.00}O_4$ | 800 | 50 | 700 | 20 |
| Example 3 | $Li_{1.09}Co_{0.88}Mn_{1.04}O_4$ | 850 | 24 | 700 | 12 |
| Example 4 | $Li_{1.00}Co_{0.90}Ni_{0.03}Mn_{1.07}O_4$ | 850 | 24 | 700 | 12 |
| Comparative Example 1 | $Li_{1.2}Co_{0.6}Mn_{1.2}O_4$ | 700 | 50 | — | — |

TABLE 1-continued

|  | Target Composition | Calcining Conditions | | | |
|---|---|---|---|---|---|
|  |  | Regular Calcination | | Annealing | |
|  |  | Temperature (° C.) | Time (h) | Temperature (° C.) | Time (h) |
| Comparative Example 2 | $Li_{1.1}Co_{0.7}Mn_{1.2}O_4$ | 700 | 50 | — | — |
| Comparative Example 3 | $Li_{1.0}Ni_{0.5}Mn_{1.5}O_4$ | 950 | 35 | 700 | 35 |
| Comparative Example 4 | $Li_{1.0}Co_{0.5}Ni_{0.5}Mn_{1.0}O_4$ | 850 | 24 | 700 | 12 |

TABLE 2

|  | Analyzed Values | | | | Structural Analyses | | | | | |
|---|---|---|---|---|---|---|---|---|---|---|
|  | Li (wt %) | Co (wt %) | Mn (wt %) | Ni (wt %) | Li—O (Å) | Crystallite Size (nm) | Me—O (Å) | Strain | Rwp | GOF |
| Example 1 | 3.9 | 26.5 | 32.6 | <0.005 | 1.890 | 180 | 1.940 | 0.333 | 4.64 | 1.41 |
| Example 2 | 3.9 | 31.8 | 29.1 | <0.005 | 1.868 | 120 | 1.948 | 0.294 | 4.94 | 1.60 |
| Example 3 | 4.6 | 28.5 | 32.0 | 0.02 | 1.860 | 150 | 1.953 | 0.244 | 6.24 | 1.59 |
| Example 4 | 3.8 | 28.7 | 31.9 | 1.0 | 1.872 | 161 | 1.952 | 0.395 | 4.37 | 1.58 |
| Comparative Example 1 | 4.6 | 27.0 | 32.4 | <0.005 | 1.839 | 60 | 1.962 | 0.673 | 5.06 | 1.41 |
| Comparative Example 2 | 4.4 | 26.3 | 34.0 | <0.005 | 1.876 | 40 | 1.942 | 0.573 | 2.84 | 4.59 |
| Comparative Example 3 | 3.9 | <0.005 | 44.1 | 15.3 | 1.926 | 130 | 1.926 | 1.955 | 6.55 | 1.54 |
| Comparative Example 4 | 3.8 | 16.0 | 29.7 | 15.9 |  |  |  |  |  |  |

TABLE 3

|  | Powder Physical Property Values | | | |
|---|---|---|---|---|
|  | D10 (μm) | D50 (μm) | Dmin (μm) | SSA (m²/g) |
| Example 1 | 5.6 | 11.8 | 2.1 | 1.5 |
| Example 2 | 3.9 | 14.4 | 0.9 | 3.1 |
| Example 3 | 4.1 | 13.5 | 1.1 | 1.2 |
| Example 4 | 5.1 | 12.9 | 1.9 | 1.5 |
| Comparative Example 1 | 3.1 | 11.6 | 0.8 | 6.8 |
| Comparative Example 2 | 3.8 | 13.4 | 0.8 | 0.5 |
| Comparative Example 3 | 8.1 | 17.2 | 3.0 | 0.3 |
| Comparative Example 4 | 7.9 | 13.8 | 4.2 | 0.5 |

TABLE 4

|  | Cell Characteristics | | | | | | | |
|---|---|---|---|---|---|---|---|---|
|  | 5.5 to 3.0 V | | | | | | 5.5 to 4.7 V | | 5.5 to 5.0 V | |
|  | Charge Capacity (mAh/g) a | Discharge Capacity (mAh/g) b | Charge and Discharge Efficiency (%) b/a × 100 | Open Circuit Voltage After Charge (V) | Discharge Capacity (mAh/g) d | Proportion (%) d/b × 100 | Discharge Capacity (mAh/g) e | Proportion (%) e/b × 100 |
| Example 1 | 142.2 | 120.4 | 84.7 | 5.30 | 90.8 | 75.4 | 48.8 | 40.5 |
| Example 2 | 143.8 | 108.5 | 75.5 | 5.28 | 86.4 | 79.6 | 39.3 | 36.2 |
| Example 3 | 130.0 | 99.9 | 76.9 | 5.26 | 71.5 | 71.5 | 32.5 | 32.5 |
| Example 4 | 132.7 | 110.6 | 83.4 | 5.28 | 72.7 | 65.7 | 35.4 | 32.0 |
| Comparative Example 1 | 155.5 | 101.9 | 65.5 | 5.25 | 63.8 | 62.6 | 25.6 | 25.1 |
| Comparative Example 2 | 159.8 | 106.3 | 66.5 | 5.28 | 78.4 | 73.7 | 31.7 | 29.8 |
| Comparative Example 3 | 135.4 | 132.9 | 98.2 | 4.91 | 88.0 | 66.2 | 0 | 0 |
| Comparative Example 4 | 73.4 | 66.8 | 91.1 | 4.86 | 0.2 | 0.3 | 0 | 0 |

(Consideration)

It was thus found that when the crystallite size of the present spinel was 100 nm to 200 nm; the interatomic distance of Li—O as measured by the Rietveld method using the fundamental method was 1.80 Å to 2.00 Å; and the strain was 0.20 to 0.50, the present spinel had an operating potential of 4.5 V or higher, and was capable of extending its capacity region of 5.0 V or higher and was capable of enhancing its energy density.

It was also found that the capacity region exhibiting a stable voltage in the region of 5.0 V or higher could be extended.

It was further found that even when part of Co was substituted with Ni, the amount of Co could be reduced with the similar effect being maintained. By substituting expensive Co with Ni, cost reduction could be achieved with the similar characteristics being provided. It was further found that by the substitution with Ni, since the stabilization of the crystal structure was brought about, more stabilized Li intercalation and deintercalation in the high-potential side was made possible and the charge-discharge cycle ability was improved.

It is presumed that there is possible the element substitution on the 16d site even with elements such as Mg, Ti, Al, Ba, Cr, Fe, Mo, W, Zr, Y and Nb, whose valences are near those of Ni, Co and Mn, and it can be presumed that the element substitution has an effect on the structure stability, that is, on the charge-discharge cycle ability. It can be therefore considered that even when part of Mn is substituted with these elements, as seen in the case where part of Mn is substituted with Co, a predetermined effect can securely be obtained together with Co and Ni while the amount of Co is reduced.

The invention claimed is:

1. A spinel-type lithium cobalt manganese-containing complex oxide, having a crystal structure classified as a space group Fd-3m and being represented by a general formula [$Li_x(Co_yM_zMn_{3-x-y-z})O_{4-\delta}$], wherein $0.90 \leq x \leq 1.15$, $0.90 \leq y \, 1.25$ and $0 < z \leq 0.3$, wherein M is Ni or a combination of Ni with one or two or more elements selected from the group consisting of Mg, Ti, Al, Ba, Cr, Fe, Mo, W, Zr, Y and Nb, and wherein $0 \leq \delta < 4$ wherein the spinel-type lithium cobalt manganese-containing complex oxide has a crystallite size measured by a Rietveld method using a fundamental method of 100 nm to 200 nm, an interatomic distance of Li—O of 1.80 Å to 2.00 Å, and a strain of 0.20 to 0.50, and wherein the spinel-type lithium cobalt manganese-containing complex oxide has an operating potential of 4.5 V or higher at a metal Li reference potential.

2. A lithium secondary cell, comprising a spinel-type lithium cobalt manganese-containing complex oxide according to claim 1 as a positive electrode active substance thereof.

* * * * *

UNITED STATES PATENT AND TRADEMARK OFFICE
CERTIFICATE OF CORRECTION

PATENT NO. : 9,786,914 B2
APPLICATION NO. : 15/100354
DATED : October 10, 2017
INVENTOR(S) : Kyohei Yamaguchi et al.

Page 1 of 1

It is certified that error appears in the above-identified patent and that said Letters Patent is hereby corrected as shown below:

On the Title Page

Column 2, Item (57) ABSTRACT, Line 9, delete "[$Li_x(Co_yMn_{3-x-y})O_{4-\delta}$]" and insert -- [$Li_x(Co_yMn_{3-x-y})O_{4-\delta}$] --

In the Claims

Column 18, Line 12, Claim 1, delete "$0.90 \leq y\ 1.25$" and insert -- $0.90 \leq y \leq 1.25$ --

Column 18, Line 15, Claim 1, after "$0 \leq \delta < 4$" insert -- , --

Signed and Sealed this
Twenty-second Day of May, 2018

Andrei Iancu
*Director of the United States Patent and Trademark Office*